United States Patent [19]

Ghoshal

[11] Patent Number: 5,946,176
[45] Date of Patent: Aug. 31, 1999

[54] ELECTROSTATIC DISCHARGE PROTECTION UTILIZING MICROELECTROMECHANICAL SWITCH

[75] Inventor: Uttam Shyamalindu Ghoshal, Austin, Tex.

[73] Assignee: International Business Machines Corporation, Armonk, N.Y.

[21] Appl. No.: 09/134,690

[22] Filed: Aug. 17, 1998

[51] Int. Cl.⁶ .................................................. H02H 3/22
[52] U.S. Cl. ........................ 361/56; 361/111; 29/622; 438/52
[58] Field of Search ................... 361/56, 91, 111; 257/355–362; 29/592.1, 622, 729; 438/52, 200

[56] References Cited

U.S. PATENT DOCUMENTS 5,744,840  4/1998  Ng .
5,744,841  4/1998  Gilbert et al. .
5,745,324  4/1998  Forsland et al. .
5,798,283  8/1998  Montague et al. ........................ 438/24

*Primary Examiner*—Michael J. Sherry
*Attorney, Agent, or Firm*—Casimer K. Salys; Jack V. Musgrove; Andrew J. Dillon

[57] ABSTRACT

An integrated circuit having electrostatic discharge protection. The integrated circuit is built from a semiconducting substrate. A circuit is formed within the semiconductor substrate. The circuit has an input and a ground. A voltage activated microelectromechanical switch is fabricated within the semiconducting substrate utilizing integrated circuit techniques. The microelectromechanical switch is coupled across the circuit input and the circuit ground. The voltage activated microelectromechanical switch couples the circuit input to the circuit ground when an electrostatic discharge voltage of sufficient magnitude is applied to the input of the circuit such that the electrostatic discharge is dissipated to ground through the microelectromechanical switch thereby protecting the circuit from ESD.

13 Claims, 2 Drawing Sheets

ELECTROSTATIC DISCHARGE PROTECTION UTILIZING MICROELECTROMECHANICAL SWITCH

BACKGROUND OF THE INVENTION

1. Technical Field

The present invention relates in general to electrostatic discharge protection, and in particular to electrostatic discharge protection for integrated circuits. Still more particularly, the present invention relates to a microelectromechanical switch (MEMS) for electrostatic discharge protection.

2. Description of the Related Art

An electrostatic charge or static electricity possessed by a human can reach levels of over 1000 volts. Modern computer circuitry utilizes voltages lower than 1.5 volts in digital logic circuits. Consequently, the transfer of a static charge from a human into computer circuitry can cause serious damage to electronic circuitry. Protection of electronic circuits from electrostatic discharge (ESD) has been an onerous problem since the advent of the transistor.

A human can build up a charge on his or her body through mechanical motion against surfaces such as carpet (i.e, triboelectric charging). When the fingertip of a charged human comes in close proximity to a conductor which is coupled to a circuit board, the carried charge rapidly discharges through every circuit coupled to the conductor. In the ESD process many sensitive circuits can be irreversibly damaged.

Complementary metal-oxide semiconducity (CMOS) circuits and integrated circuits having small geometries are now widely utilized in the home and office. Environmental conditions in the home and office subject sensitive circuits to electrostatic discharge by humans. As manufacturers attempt to increase the reliability of electronic equipment, prevention of ESD damage has become a primary concern.

One method implemented to protect electronic circuits from ESD damage is to incorporate filters on the input of integrated circuits. ESD filters are typically comprised of resistors and diodes or any combination thereof. FIG. 1 depicts a typical ESD filter circuit which utilizes resistors and reverse-biased diodes for decoupling ESD transients. Resistor 4, first diode 6 and second diode 8 provide a dissipative path for ESD transients.

The resistance of resistor 4 and the inherent capacitance associated with the reverse-biased state of first diode 6 and the reverse-bias state of second diode 8 significantly slow down the attainable data transmission speed of an integrated circuit.

State-of-the-art microprocessors cannot attain data transmission and reception of digital data on the order of one gigahertz due to the degradation of parasitic characteristics inherent to existing ESD filter designs.

A wide variety of designs for accomplishing on chip ESD protection or protection within integrated circuits have been developed. The primary function of an ESD protection circuit is to direct an ESD away from the circuit to be protected. Thus, if a transistor is utilized for ESD protection, the protection transistor must turn ON before the silicon junctions to be protected reach their field breakdown voltage.

Traditional on chip ESD protection circuit designs involve a trade off between increased capacitance on the input and output (I/O) transmission lines and the transient voltage dissipation capacity.

Integrated circuits utilizing silicon-on-insulator (SOI) technology are sensitive to increased capacitance on transmission lines. SOI technology places the electron transport layer above an insulator. Hence, the electron transport layer is electrically isolated from the substrate of the integrated circuit.

One method of creating an isolated silicon layer is by utilizing a separation by implantation of oxygen (SIO), SIMOX or SOI CMOS method. In a typical SIO method, oxygen is implanted in a single crystal silicon wafer by a bombardment technique which controls the depth of penetration of the silicon substrate by oxygen atoms. A layer of silicon oxide is formed below the thin layer of silicon which has been penetrated by oxygen atoms.

The insulator in popular SOI CMOS technologies is silicon dioxide, an electrical insulator that is also a poor thermal conductor. When ESD protection in SOI circuits utilizes bypass diodes for ESD protection, the Joule heat developed in the diodes during an ESD is thermally trapped locally in the region around the diode and the transient temperature rise is often sufficient to melt down the semiconductor junction which forms the diode. The self-heating effect and resulting silicon junction melt down is not well understood by those skilled in the art.

Self-heating and melt down presents serious reliability problems for deep sub-micron SOI CMOS technology utilizing silicon junctions for ESD protection. Circuits implemented on an electrically isolated layer are more susceptible to damage due to meltdown from electrostatic discharge than traditional complimentary metallic oxides semiconductor (CMOS) circuits.

Although mechanical switches are robust and can dissipate thousands of volts, mechanical switches are typically too slow to be utilized in ESD protection circuits. Further, mechanical switches can handle a significant amount of instantaneous currents without failing. However, mechanical switches are also typically too large to be implemented in proximity to an integrated circuit.

It should therefore be apparent that there is a need for improved electrostatic discharge protection for integrated circuits. Additionally, it would be desirable to provide a small electromechanical switch which could provide electrostatic discharge protection.

SUMMARY OF THE INVENTION

It is therefore one object of the present invention to provide improved electrostatic discharge protection.

It is another object of the present invention to provide improved electrostatic discharge protection for integrated circuits.

It is yet another object of the present invention to provide a microelectromechanical switch (MEMS) for electrostatic discharge protection.

The foregoing objects are achieved as is now described. An integrated circuit having electrostatic discharge protection is disclosed. The integrated circuit is manufactured from a semiconducting substrate. A circuit is formed within the semiconductor substrate. The circuit has an input and a ground. A voltage activated microelectromechanical switch is fabricated within the semiconducting substrate utilizing integrated circuit techniques. The microelectromechanical switch is coupled across the circuit input and the circuit ground. The voltage activated microelectromechanical switch couples the circuit input to the circuit ground when an electrostatic discharge voltage of sufficient magnitude is applied to the input of the circuit such that the electrostatic discharge is dissipated to ground through the microelectromechanical switch, thereby protecting the circuit from ESD.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 2:
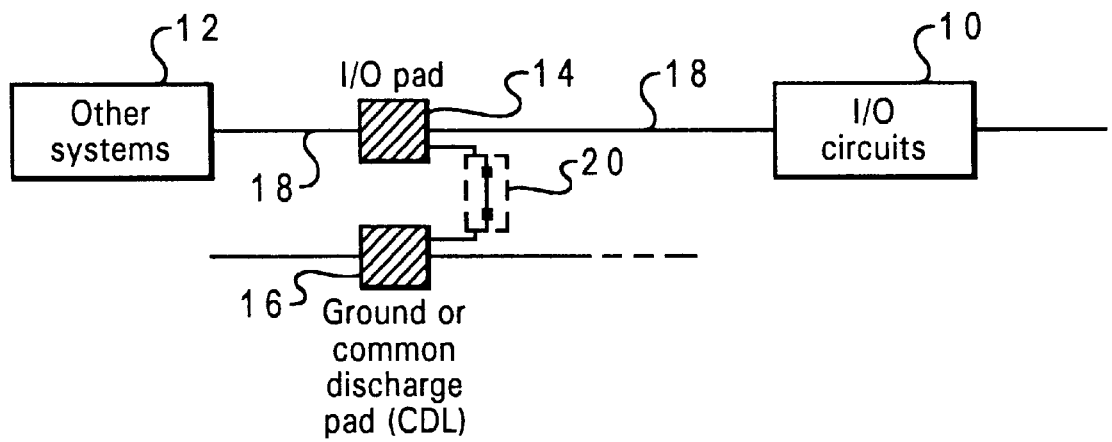
FIG. 2 is a schematic illustration of a typical placement of ESD protection device in accordance with the present invention.

With reference now to the figures and in particular with reference to FIG. 2, one embodiment of a circuit configuration for electrostatic discharge protection within an integrated circuit is depicted. Input and output (I/O) circuits 10 provide an interface for transmission and reception of signals to other systems 12. I/O circuits are typically comprised of driver circuits and receiving circuits. I/O circuits 10 might level shift incoming or outgoing signals or convert differential signals to single ended signals.

I/O circuits 10 is coupled to I/O pad 14. I/O pad 14 provides a mechanical means to wire bond I/O circuits 10 to package leads (not shown) of an integrated circuit. Transmission line 18 interconnects I/O circuits 10 to other systems 12. A ground or common discharge pad 16 provides a means for physical interconnection of an ESD device 20 from transmission line 18 to ground via I/O pad and common discharge pad 16. The illustrated configuration allows ESD device 20 to dissipate a static discharge to ground, such that the transient discharge voltage does not transfer through I/O circuits 10.

Typically, the level of ESD protection provided by a circuit will vary with the type of fabrication process utilized to create the integrated circuit. It will be appreciated by those having skill in the art that the ESD devise disclosed in the present application may be employed between input pads and input buffers or any input configuration as well as any output configuration for any device or circuit requiring ESD protection. The pads and transmission line configuration in FIG. 2 are for illustration purposes only and should not be utilized to limit the scope of the present invention.

Figure 3:
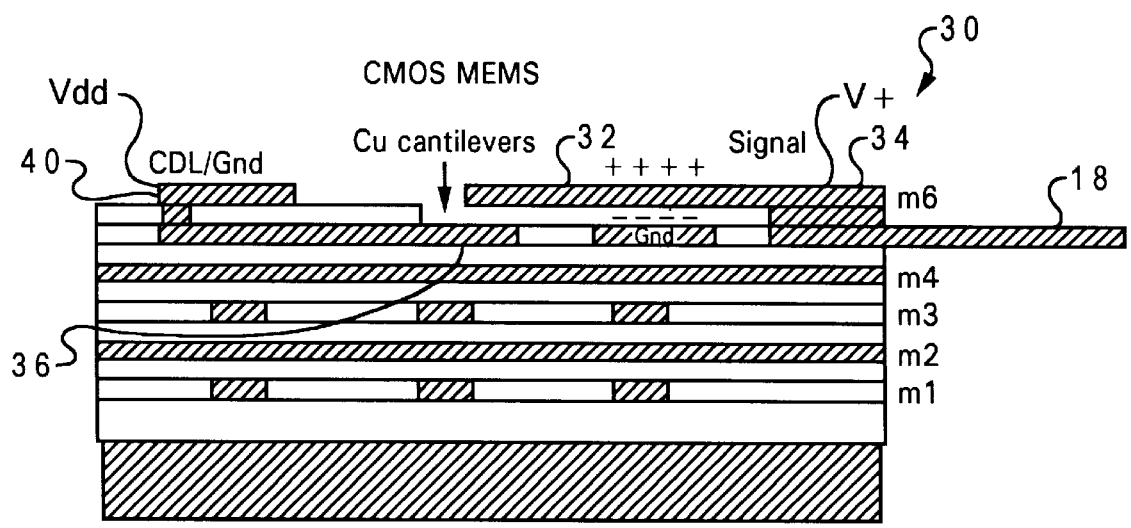
FIG. 3 illustrates a side view of the structure of a representative cantilever-based electromechanical switch manufactured utilizing CMOS technology in accordance with the present invention.

Referring to FIG. 3, microelectromechanical switch (MEMS) 30 is a possible physical implementation of an ESD device which could be utilized as ESD device 20 of FIG. 2 in accordance with the present invention. MEMS 30 can be manufactured utilizing mature integrated circuit manufacturing processes such as a CMOS manufacturing process utilizing deposition and etching.

MEMS 30 provides a very low impedance path or bypass to ground for the discharge of static electricity when MEMS 30 is activated. A transient voltage resulting from an electrostatic discharge will travel the path of least resistance. Therefore, a transient discharge voltage on a transmission line, such as transmission line 18 of FIG. 2, which is coupled to pedestal 34 will be dissipated to ground via MEMS 30 rather than entering and damaging sensitive circuits within the integrated circuit. MEMS 30 can repeatedly dissipate transient voltage spikes from several hundred volts to several hundred kilo-volts without failing because no silicon junction is required to withstand the voltage spike.

A typical integrated circuit is comprised of millions of silicon junctions. MEMS 30 can dissipate an electrical charge without creating significant local heating of silicon junctions. Specifically, the present invention can eliminate local heating of silicon junctions due to an ESD in a silicon on insulator environment. The rapid rise times associated with electrostatic discharges can be very harmful to silicon junctions. Rapid rise times cause a phenomena called "punch through", where a silicon junction is punctured and the silicon junction is no longer capable of controlling electron flow and switching states.

Figure 1:
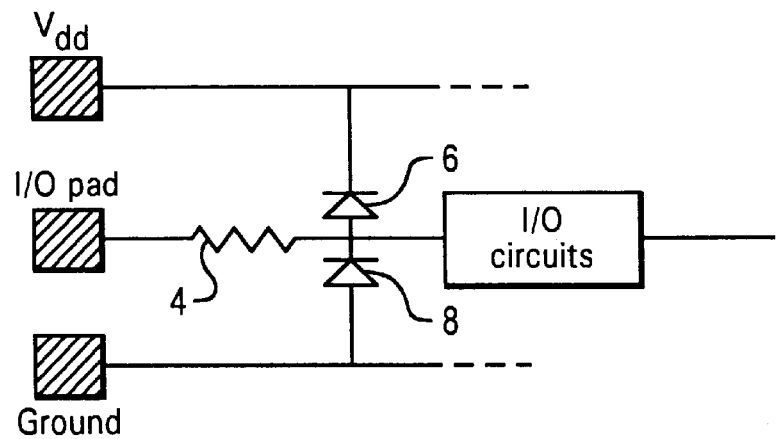
FIG. 1 is a schematic depiction of a typical resistor-diode circuit utilized to decouple ESD transients.

Placement of MEMS 30 between the I/O circuit input and ground only marginally increases the input capacitance of the integrated circuit. MEMS 30 adds approximately 10 femtofarads capacitance to transmission line 18 of FIG. 1. Utilization of a diode or other traditional configurations of ESD protection typically add 100 femtofarads of capacitance to the input or output conductors of an integrated circuit.

Electrical parameters of silicon dictate the undesirable parasitic capacitance in traditional ESD protection circuits. However, the electrical parameters of silicon do not dictate the parasitic electrical properties when MEMS 30 is utilized for ESD protection.

MEMS 30 is created utilizing cantilever 32 affixed to pedestal 34. In a preferred embodiment, cantilever 32 is implemented utilizing copper. When induced by an electrical charge, cantilever 32 deforms downward and provides electrical continuity from pedestal 34 to contact 36. Cantilever 32 can be implemented utilizing any conductive material which provides adequate flexibility such that an electrostatic force can deflect cantilever 32 to within close proximity of contact 36.

MEMS 30 is fabricated in an upper metal layer by the deposition of copper. In a static state or under normal operation, MEMS 30 is open i.e., cantilever 32 is parallel with upper metal layer 40. When $V<V_{dd}$ cantilever 32 is straight or not significantly deflected from its static state. In the open condition, the capacitance from the input pad to ground is small. When a large voltage is applied to pedestal 34 or V>1.5 Vdd, the electrostatic attraction force between cantilever 32 and contact 36 deflects cantilever 32 towards contact 36 and electron transfer occurs to dissipate the electrostatic discharge on transmission line 18. Electrostatic force between cantilever 32 and contact 36 is always attractive because contact 36 always remains at ground potential.

When the voltage differential and resulting force exerted on cantilever 32 by an incoming transient voltage due to an ESD exceeds 1.5 volts, cantilever 32 deflects and makes contact with contact 36. When cantilever 32 touches contact 36, I/O pad 14 is shorted to contact 36 and to ground potential. Contact 36 is coupled to ground pad or the common discharge pad 16. The length of cantilever 32 can be adjusted to achieve a closure response on the order of a nanosecond.

When cantilever 32 and contact 36 are manufactured utilizing copper, a very low resistance can be achieved across MEMS 30 when MEMS 30 is in the closed position. Utilizing copper-to-copper contacts within MEMS 30 provides an "ON" resistance on order of one milliohm when contact between cantilever 32 and contact 36 is made. The low "ON" resistance provided by the MEMS 30 is well suited to solve the inadequate performance of prior art ESD circuits which utilize silicon on insulator technology.

The relationship between the cantilever deflection and the electrostatic force applied can be described as follows:
Equation 1:

$$kv = \varepsilon_O A_g \frac{V^2}{2(d-v)^2}$$

or rewritten as:
Equation 2:

$$V(v) = (d-v)\sqrt{\frac{2kv}{\varepsilon_O A_g}}$$

where d is the initial spacing between the cantilever and the gate electrode is the permittivity of free space and Ag is the gate cantilever overlap area and v is the deflection of the cantilever from its original position. For small deflections, the spring constant k for the deflection at the end of cantilever is given by
Equation 3:

$$k = \frac{wh^3 Y}{4l^3}$$

where w, h, and l are the width, thickness and length of the cantilever and Y is the Young's modulus. Typical geometries of a copper cantilever beam with Y=150 GPa are: w=3 $\mu$m, h=1 $\mu$m, d=0.5 $\mu$m, I=20 $\mu$m, Ag=20 $\mu m^2$. The arm length can be adjusted for a 1.5–2V voltage threshold and a nanosecond "snap" response. The lifetime of copper cantilever switches can be greater than $10^9$ cycles in dry nitrogen when the electromechanical switch is operated at 10 volts and contact current densities of $10^9$ $A/m^2$ at an accelerated pace of 2.5 KHz.

Cantilevers manufactured from stiffer materials can also be deflected by CMOS circuit compatible voltages. The operation of cantilevers in the non-contact mode is important in eliminating the problem of contacts sticking in the closed position.

MEMS 30 does not significantly increase the I/O lead capacitances of an integrated circuit as compared to varistors, zener diodes or other known forms of ESD protection. However, traditional ESD circuits particularly those utilizing silicon junctions significantly increase the capacitance from an integrated circuit input to ground.

Although an integrated circuit configuration has been described, the structure of MEMS 30 can also be incorporated into multi-chip module packaging structures. Additionally, MEMS could be utilized in alternate packaging structures such as off chip packaging. Placement of a series of microelectromechanical switches at a printed circuit board I/O connector would also provide beneficial ESD protection.

Classical ESD circuit designs which are implemented utilizing silicon on insulator technology are easily destroyed by an ESD because SOI circuits typically cannot dissipate the required amount of instantaneous power. Additionally, an ESD circuit implemented utilizing silicon on insulator technology has a relatively high impedance to ground.

In contrast, MEMS 30 provides a low impedance path to ground for transient voltages as a result of electrostatic discharge. Further, microelectromechanical switch is very robust and can repeatedly withstand an electrostatic discharge of well over 4 kilo volts.

FIG. 3 schematically illustrates the structure of a representative MEMS of the type particularly suited to the present invention. The MEMS switch illustrated in FIG. 3 is fabricated utilizing conventional integrated circuit techniques. Cantilever 32 is deposited as a layer of copper on a substrate surrounded by silicon in the wafer. Thus, after initial fabrication processes, cantilever 32 is continuous with upper metal layer 40.

Post process etching removes material which surrounds cantilever 32 thus freeing cantilever 32 to allow cantilever 32 to move in relationship to the surrounding silicon. MEMS 30 is formed in the top layers of the wafer allowing access for the post process of etching material around, and specifically, under cantilever 32.

The final structure is created by local removal of the lower CMOS metalization layer. One removal process is referred to as "micro-machining". However, many etching processes could be utilized to free cantilever 32 from surrounding material. Often, pad structures provide access to the layers to be removed. The selective removal of metal layers can also be accomplished by a "wet etchant" process.

Other micro-machining techniques could also be utilized to manufacture the present invention. For example, a front etching technique can utilize a n-well as an electrochemical etch stop to form a n-well silicon beam suspended by dielectric hinges with electrical leads.

Another front-etching technique produces laminated high aspect ratio structures starting from a triple-metal CMOS wafer post processed by "anisotropic oxide etching" to cut through the dielectric layers. This process is followed up by a anisotropic and isotropic silicon etching to release the cantilever. Other process utilize a "chi-junction" as an etch stop for KOCH etching of the silicon process can be accomplished from the back of the wafer.

A typical MEMS 30 is based upon a silicon/polysilicon cantilever structure or a copper electromechanical relay. Many different manufacturing processes for fabricating MEMS are well known by those having skill in the art. A more indepth description of MEMS manufacturing utilizing standard CMOS technology is provided by, H. Blates and A. Haberli, "CMOS MEMS," Proceedings of 1997 IEEE International Symposium of Circuits and Systems, pp. 2813–2816, June 9–12, Hong Kong, 1997. Additional information is provided by G. K. Fedder, in "Integrated Microelectromechanical Systems in Conventional CMOS," Proceedings of 1997 IEEE International Symposium on Circuits and Systems, pp. 2821–2824, June 9–12, Hong Kong, 1997.

Any MEMS having the attractive force properties and the required "ON" resistance will preform well in the present invention. Additionally, any manufacturing process could be utilized to fabricate MEMS and not part from the scope of the present inveniton. In FIG. 3, MEMS 30 has a low conductivity when in an open state yet a very high conductivity when MEMS 30 is closed by actuation. It is preferred that cantilever 32 has a high aspect ratio or a large length to width ratio, where introduction of an electrical current into pedestal 40 produces a force adequate to deflect cantilever 32 from a state parallel with upper metal layer 34 such that contact is made between cantilever 32 and contact 36.

While the invention has been particularly shown and described with reference to a preferred embodiment, it will be understood by those skilled in the art that various changes in form and detail may be made therein without departing from the spirit and scope of the invention.

What is claimed is:

1. A circuit having electrostatic discharge protection, said circuit comprising:
   a semiconducting substrate;
   a circuit formed within said semiconducting substrate, said circuit having an input and a ground; and
   a voltage-activated microelectromechanical switch formed within said semiconducting substrate, said microelectromechanical switch coupled across said input and said ground of said circuit, wherein said voltage activated microelectromechanical switch couples said input to said ground when an electrostatic discharge voltage of sufficient magnitude is applied to said input.

2. The circuit of claim 1, wherein said microelectromechanical switch further comprises a cantilever and a contact formed within said semiconducting substrate.

3. The circuit of claim 2, wherein said cantilever and said contact are manufactured utilizing copper.

4. The circuit of claim 1, wherein said circuit is manufactured utilizing a silicon on oxide process.

5. The circuit of claim 1, wherein said microelectromechanical switch is implemented utilizing integrated circuit manufacturing processes.

6. The circuit of claim 1, wherein said microelectromechanical switch is integral with an integrated circuit.

7. The circuit of claim 1, wherein said microelectromechanical switch is external to an integrated circuit which contains said circuit.

8. The circuit of claim 1, wherein said microelectromechanical switch is implemented in a multi-chip packaging structure.

9. An integrated circuit having electrostatic discharge protection, said integrated circuit comprising:
   a semiconducting substrate;
   a circuit formed within said semiconducting substrate, said circuit having an input and a ground; and
   a mechanical switch means formed within said integrated circuit, said mechanical switch means coupled across said input and said ground of said circuit, wherein said mechanical switch means couples said input to said ground when an electrostatic discharge voltage of sufficient magnitude is applied to said input.

10. A method for manufacturing ESD protection for integrated circuits comprising the steps of:
    depositing a cantilever and a contact on a silicon substrate to form a microelectromechanical switch across a circuit input and a circuit ground; and
    removing material between said cantilever and said contact to provide an area between said cantilever and said contact, such that when an electrostatic discharge occurs on said circuit input said cantilever can touch said contact wherein said circuit is protected when said microelectromechanical switch dissipates said electrostatic discharge.

11. The method for manufacturing ESD protection for integrated circuits as in claim 10, wherein said step of removing further includes an etching process.

12. The method for manufacturing ESD protection for integrated circuits as in claim 10, wherein said step of removing further includes a wet etchant process.

13. The method for manufacturing ESD protection for integrated circuits as in claim 10, wherein said step of removing further includes an anisotropic oxide etching process.

* * * * *